United States Patent
Ono

(10) Patent No.: US 11,932,110 B2
(45) Date of Patent: Mar. 19, 2024

(54) INFORMATION PROVISION SYSTEM

(71) Applicant: TOYOTA JIDOSHA KABUSHIKI KAISHA, Toyota (JP)

(72) Inventor: Sayaka Ono, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/126,770

(22) Filed: Mar. 27, 2023

(65) Prior Publication Data

US 2023/0226911 A1 Jul. 20, 2023

Related U.S. Application Data

(63) Continuation of application No. 17/086,746, filed on Nov. 2, 2020, now Pat. No. 11,639,105.

(30) Foreign Application Priority Data

Nov. 8, 2019 (JP) .................. 2019-203301

(51) Int. Cl.
*B60K 35/00* (2006.01)
*B60K 37/06* (2006.01)

(52) U.S. Cl.
CPC ............. *B60K 35/00* (2013.01); *B60K 37/06* (2013.01); *B60K 2370/172* (2019.05); *B60K 2370/175* (2019.05); *B60K 2370/1868* (2019.05); *B60K 2370/188* (2019.05); *B60K 2370/33* (2019.05)

(58) Field of Classification Search
CPC .. B60K 35/00; B60K 37/06; B60K 2370/172; B60K 2370/175; B60K 2370/1868; B60K 2370/1523; B60K 2370/188; B60K 2370/33
See application file for complete search history.

(56) References Cited

U.S. PATENT DOCUMENTS

| | | | |
|---|---|---|---|
| 2016/0144785 A1 | 5/2016 | Shimizu | |
| 2017/0001522 A1 | 1/2017 | Mochizuki | |
| 2018/0272935 A1 | 9/2018 | Moriwaki | |
| 2019/0184829 A1 | 6/2019 | Mizukoshi | |
| 2020/0031230 A1* | 1/2020 | Ledermann | B60K 37/02 |
| 2020/0172122 A1 | 6/2020 | Mimura | |

FOREIGN PATENT DOCUMENTS

| | | |
|---|---|---|
| EP | 3388286 B1 | 3/2003 |
| JP | 2006-171885 A | 6/2006 |
| JP | 2010041240 A | 2/2010 |

(Continued)

*Primary Examiner* — Christopher E Leiby
(74) *Attorney, Agent, or Firm* — Dinsmore & Shohl LLP

(57) ABSTRACT

An information provision system mounted on a vehicle includes: a visual device configured to visually provide information to an occupant of the vehicle; and a controller configured to control the visual device. The controller is further configured to: cause the visual device to provide first information in a first period; cause the visual device to provide second information different from the first information in a second period later than the first period; and set at least one of a luminance and a saturation of the visual device in at least a part of an information switching period between the first period and the the second period to be lower than that in the first period and the second period.

12 Claims, 11 Drawing Sheets

(56) References Cited

FOREIGN PATENT DOCUMENTS

| JP | 2015182624 A | 10/2015 |
|----|--------------|---------|
| JP | 2017016457 A | 1/2017  |
| JP | 2018161950 A | 10/2018 |
| JP | 2018185641 A | 11/2018 |
| JP | 2019125384 A | 7/2019  |

* cited by examiner

INFORMATION PROVISION SYSTEM

CROSS-REFERENCE TO RELATED APPLICATION

This application is a continuation of U.S. patent application Ser. No. 17/086,746 filed Nov. 2, 2020 and claims priority to Japanese Patent Application No. 2019-203301 filed on Nov. 8, 2019, the entire contents of which are herein incorporated by reference.

BACKGROUND

Technical Field

The present disclosure relates to an information provision system mounted on a vehicle.

Background Art

Patent Literature 1 discloses an information display device used in an automated driving vehicle. The information display device has a display means that displays an image, and a display control means that causes the display means to display an image of a steering wheel of the vehicle and an image of a human hand at the same time. The display control means changes at least one of the image of the steering wheel of the vehicle and the image of the human hand according to an automated driving level.

Patent Literature 2 discloses an information provision device for use in a vehicle. The information provision device presents whether automated driving control is possible or not.

List of Related Art
Patent Literature 1: Japanese Laid-Open Patent Application Publication No. JP-2015-182624
Patent Literature 2: Japanese Laid-Open Patent Application Publication No. JP-2018-185641

SUMMARY

As exemplified in the above-described Patent Literature 1, in recent years, information is sometimes visually provided from an in-vehicle device to an occupant (e.g., a driver). When the information changes, the information after the change is likely to be important to the occupant, and thus it is desirable for the occupant to easily notice the information change. However, in the case of the technique described in Patent Literature 1, the image displayed on the display means merely changes from a first image representing the information before the change to a second image representing the information after the change. Therefore, it is difficult for the occupant to notice the information change.

An object of the present disclosure is to provide a technique that can visually provide information to an occupant of a vehicle and facilitate the occupant to more easily notice a change in information.

A first aspect of the present disclosure is directed to an information provision system mounted on a vehicle. The information provision system includes: a visual device configured to visually provide information to an occupant of the vehicle; and a controller configured to control the visual device. The controller is further configured to: cause the visual device to provide first information in a first period; cause the visual device to provide second information different from the first information in a second period later than the first period; and set at least one of a luminance and a saturation of the visual device in at least a part of an information switching period between the first period and the the second period to be lower than that in the first period and the second period.

A second aspect of the present disclosure further has the following feature in addition to the first aspect. The visual device is installed on a dashboard of the vehicle.

A third aspect of the present disclosure further has the following feature in addition to the first or second aspect. The visual device represents the first information in a first color and represents the second information in a second color different from the first color.

A fourth aspect of the present disclosure further has the following feature in addition to any one of the first to third aspects. The vehicle is an automated driving vehicle that performs automated driving.

A fifth aspect of the present disclosure further has the following feature in addition to the fourth aspect. One of the first information and the second information is information demanding of a driver of the vehicle to grab a steering wheel during the automated driving. Another of the first information and the second information is information notifying that the driver is allowed to get hands off of the steering wheel during the automated driving.

A sixth aspect of the present disclosure further has the following feature in addition to any one of the first to fourth aspects. In response to a trigger, the controller switches the information provided through the visual device from the first information to the second information. The trigger includes a change in driving environment that requires attention of a driver of the vehicle.

A seventh aspect of the present disclosure further has the following feature in addition to the sixth aspect. The trigger includes at least one of a change in an operation required for the driver, a change in an automated driving level of the vehicle, activation of driving assist control that assists driving of the vehicle, detection of a previous stage of the activation of the driving assist control, start of a preceding vehicle, and approach of a surrounding vehicle.

An eighth aspect of the present disclosure is directed to an information provision system mounted on a vehicle. The information provision system includes: a visual device configured to visually provide information to an occupant of the vehicle; and a controller configured to control the visual device. When an operation expected of a driver of the vehicle is not performed by the driver, the controller causes the visual device to blink.

According to the first to seventh aspects of the present disclosure, the information provision system provides information to the occupant of the vehicle through the visual device. The first information is provided in the first period, and the second information is provided in the second period later than the first period. In the information switching period between the first period and the second period, the information switches from the first information to the second information. In at least a part of the information switching period, the information provision system sets at least one of the luminance and the saturation of the visual device to be lower than that in the first period and the second period. In other words, the information provision system temporarily decreases at least one of the luminance and the saturation of the visual device during the information switching period. At this time, due to a visual property of human, the occupant of the vehicle is more likely to give close attention to the visual device. As a result, the occupant of the vehicle can easily notice the change in information provided through the visual device.

According to the eighth aspect of the present disclosure, when the operation expected of the driver is not performed by the driver, the information provision system causes the visual device to blink. The blinking of the visual device applies stimulus to the driver's vision. It is thus possible to urge the driver to pay attention.

DETAILED DESCRIPTION

Embodiments of the present disclosure will be described below with reference to the attached drawings.

1. First Embodiment 1-1. Vehicle Control System

Figure 1:
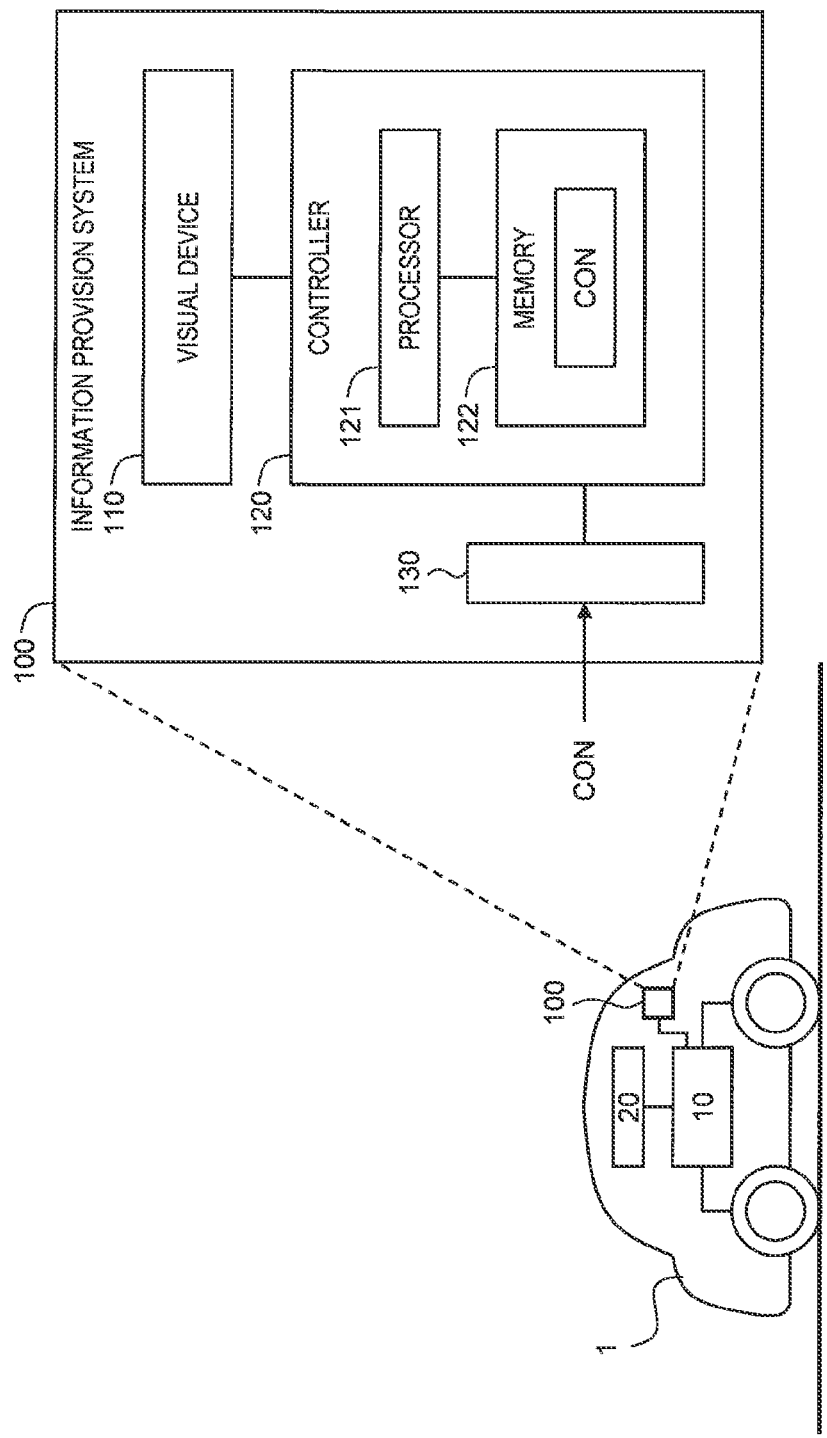
FIG. 1 is a conceptual diagram schematically showing a vehicle and an information provision system according to a first embodiment of the present disclosure.

FIG. 1 is a conceptual diagram schematically showing a vehicle 1 according to a first embodiment. A vehicle control system 10 for controlling the vehicle 1 is mounted on the vehicle 1. The vehicle 1 may be an automated driving vehicle that performs automated driving.

The vehicle control system 10 includes a sensor 20. For example, the sensor 20 includes a position sensor for detecting a position and an orientation of the vehicle 1, a surrounding situation sensor for detecting a situation around the vehicle 1, a vehicle state sensor for detecting a state of the vehicle 1, and a driver monitor for detecting a state of a driver of the vehicle 1. As the position sensor, a GPS (Global Positioning System) sensor is exemplified. As the surrounding situation sensor, a camera, a LIDAR (Laser Imaging Detection and Ranging), a radar, and the like are exemplified. As the vehicle state sensor, a vehicle speed sensor, a yaw rate sensor, a lateral acceleration sensor, a steering angle sensor, a steering torque sensor, an accelerator pedal sensor, a brake sensor, and the like are exemplified. As the driver monitor, a steering wheel touch sensor, a camera, and the like are exemplified.

Based on a result of detection by the sensor 20, the vehicle control system 10 acquires "driving environment information" indicating a driving environment for the vehicle 1. For example, the driving environment information includes position information, surrounding situation information, vehicle state information, driver state information, and the like.

The position information is information indicating the position and the orientation of the vehicle 1 and is acquired from a result of detection by the position sensor.

The surrounding situation information is information indicating the situation around the vehicle 1 and is acquired from a result of detection by the surrounding situation sensor. Typically, the surrounding situation information includes a relative position and a relative velocity of an object around the vehicle 1. As the object around the vehicle 1, a surrounding vehicle (a preceding vehicle, a following vehicle, and the like), a pedestrian, a roadside structure, a white line, and the like are exemplified.

The vehicle state information is information indicating the state of the vehicle 1 and is acquired from a result of detection by the vehicle state sensor.

The driver state information is information indicating the state of the driver and is acquired from a result of detection by the driver monitor. For example, the driver state information indicates whether the driver grabs a steering wheel or gets hands off of the steering wheel.

The vehicle control system 10 executes "vehicle travel control" that controls at least one of steering, acceleration, and deceleration of the vehicle 1 based on the driving environment information.

An example of the vehicle travel control is "automated driving control" when the vehicle 1 is an automated driving vehicle. For example, the vehicle control system 10 generates a target trajectory including at least a target position of the vehicle 1, based on map information and the driving environment information. The target trajectory may further include a target speed of the vehicle 1. The vehicle control system 10 controls the steering, the acceleration, and the deceleration so that the vehicle 1 follows the target trajectory.

During the automated driving of the vehicle 1 (i.e., the automated driving vehicle), the vehicle control system 10 may demand of the driver to "hands-on (HANDS-ON)". The hands-on means that the driver grabs the steering wheel during the automated driving. A zone in which the hands-on is demanded is hereinafter referred to as a "hands-on zone." For example, based on the surrounding situation information, the vehicle control system 10 sets a zone where the automated driving control is difficult as the hands-on zone. As another example, the hands-on zone may be predetermined. In this case, the vehicle control system 10 can recognize the hands-on zone based on the map information.

On the other hand, "hands-off (HANDS-OFF)" means that the driver is allowed to get hands off of the steering wheel during the automated driving. In zones other than the hands-on zone described above, the driver may be in the hands-off state, i.e., get hands off of the steering wheel.

Another example of the vehicle travel control is "driving assist control" that assists driving of the vehicle 1 by the driver. The driving assist control is exemplified by collision avoidance control, lane departure suppression control, and the like. The collision avoidance control controls at least one of the steering and the deceleration in order to assist avoidance of a collision between the vehicle 1 and a surrounding object. The lane departure suppression control controls the steering in order to suppress the vehicle 1 from departing from a travel lane. When an activation condition of the driving assist control is satisfied, the vehicle control system 10 activates the driving assist control.

As an example of the driving assist control, let us consider the collision avoidance control. Based on the surrounding situation information, the vehicle control system 10 recognizes an avoidance target (e.g., a surrounding vehicle, a pedestrian) ahead of the vehicle 1. Furthermore, based on the vehicle state information and the surrounding situation information, the vehicle control system 10 predicts respective future positions of the vehicle 1 and the avoidance target and calculates a possibility that the vehicle 1 collides with the avoidance target. The activation condition of the collision avoidance control is that the possibility that the vehicle 1 collides with the avoidance target is equal to or higher than an activation threshold.

As another example of the driving assist control, let us consider the lane departure suppression control. For example, when the vehicle 1 wobbles within the travel lane and comes close to a lane marking (a white line) of the travel lane, the lane departure suppression control performs the steering so as to make the vehicle 1 return back to a center of the travel lane. For that purpose, the vehicle control system 10 recognizes, based on the surrounding situation information, the lane marking of the travel lane in which the vehicle 1 is traveling and monitors a distance between the vehicle 1 and the lane marking. The activation condition of the lane departure suppression control is that the distance between the vehicle 1 and the lane marking becomes less than a predetermined distance threshold.

It should be noted that the vehicle control system 10 includes a processor and a memory device in addition to the sensor 20. The above-described driving environment information and the like are stored in the memory device. The processing by the vehicle control system 10 is achieved by the processor executing a vehicle control program that is a computer program stored in the memory device. The vehicle control program may be stored in a computer-readable recording medium.

1-2. Outline of Information Provision System

Furthermore, an information provision system 100 is mounted on the vehicle 1. The information provision system 100 provides a variety of information to an occupant (e.g., a driver) of the vehicle 1.

The information provided to the occupant of the vehicle 1 includes the above-described driving environment information, a control state of the vehicle 1, a situation around the vehicle 1, an operation demanded of the driver, a warning to the driver, and the like. The information is acquired, recognized, or determined by the vehicle control system 10 described above. That is to say, the vehicle control system 10 is able to provide a variety of information to the occupant of the vehicle 1 through the information provision system 100. In that sense, the information provision system 100 may be a system including the vehicle control system 10. Concrete examples of the information provided through the information provision system 100 are as follows.

As a first example, when the vehicle 1 is the automated driving vehicle, "a current automated driving level" is provided as the information. For example, the vehicle control system 10 calculates difficulty of the automated driving control based on the surrounding situation information, and dynamically determines the automated driving level according to the difficulty. Alternatively, a feasible automated driving level may be preset for each position or zone and registered in the map information. In this case, the vehicle control system 10 determines the automated driving level of the vehicle 1 based on the position information and the map information.

As a second example, during the automated driving of the vehicle 1, "the driver should grab the steering wheel", that is, "a demand for hands-on of the driver (hands-on demand)" is provided as the information. As described above, the hands-on zone can be recognized based on the surrounding situation information or the map information. Therefore, the vehicle control system 10 can determine whether or not to demand of the driver to hands-on based on the surrounding situation information or the map information.

As a third example, during the automated driving of the vehicle 1, "the driver is allowed to get hands off of the steering wheel", that is, "a notification of hands-off to the driver (hands-off notification)" is provided as the information. The vehicle control system 10 can determine whether or not the hands-off of the driver is allowable based on the surrounding situation information or the map information.

As a fourth example, "a warning indicating that the hands-on is not performed by the driver even though the hands-on is demanded of the driver" is provided as the information. The vehicle control system 10 can determine, based on the driver state information, whether or not the driver grabs the steering wheel, that is, whether or not the driver state is the hands-on state.

As a fifth example, "a notification that the driving assist control is activated" is provided as the information. As described above, the vehicle control system 10 activates the driving assist control when the activation condition of the driving assist control is satisfied. The vehicle control system 10 can determine whether or not to activate the driving assist control based on the activation condition of the driving assist control and the driving environment information.

As a sixth example, "a pre-warning of activation of the driving assist control" is provided as the information. Based on the activation condition of the driving assist control and the driving environment information, the vehicle control system 10 can detect that the driving assist control is likely to be activated, that is, detect a previous stage of the activation of the driving assist control. For example, with regard to the collision avoidance control, a warning threshold lower than the above-mentioned activation threshold is set. When the possibility that the vehicle 1 collides with the avoidance target exceeds the warning threshold, it is detected as the previous stage of the activation of the collision avoidance control.

As a seventh example, "a demand for a braking operation of the driver" is provided as the information. For example, based on the surrounding situation information, the vehicle control system 10 recognizes a preceding vehicle ahead of the vehicle 1 and calculates a TTC (Time-To-Collision) with the preceding vehicle. When the TTC becomes less than a predetermined threshold, the vehicle control system 10 demands of the driver to perform a braking operation.

As an eighth example, "a warning indicating that the braking operation is not performed by the driver even though the braking operation is demanded of the driver" is provided as the information. The vehicle control system 10 can determine whether or not the braking operation is performed by the driver based on the vehicle state information.

As a ninth example, when the vehicle 1 is stopped, "a notification that a preceding vehicle ahead of the vehicle 1 starts moving" is provided as the information. The vehicle control system 10 can detect the start of the preceding vehicle based on the surrounding situation information.

As a tenth example, "a notification (warning) that a surrounding vehicle (e.g., a high-speed following vehicle) is approaching the vehicle 1" is provided as the information. For example, based on the surrounding situation information, the vehicle control system 10 recognizes a following vehicle behind the vehicle 1 and calculates a TTC with the following vehicle. When the TTC becomes less than a predetermined threshold, the vehicle control system 10 determines that a high-speed following vehicle is approaching.

The vehicle control system 10 generates an information provision control signal CON. The information provision control signal CON includes an information provision instruction to the information provision system 100 and the information provided through the information provision system 100 (see the first to tenth examples described above). The vehicle control system 10 outputs the information provision control signal CON to the information provision system 100. The information provision system 100 receives the information provision control signal CON from the vehicle control system 10. Then, in accordance with the information provision instruction, the information provision system 100 provides the information included in the information provision control signal CON to the occupant of the vehicle 1.

1-3. Configuration Example of Information Provision System

The information provision system 100 according to the present embodiment is configured to "visually" provide the information to the occupant of the vehicle 1. A configuration example of the information provision system 100 is also shown in FIG. 1. As shown in FIG. 1, the information provision system 100 includes a visual device 110, a controller 120, and an interface 130.

The visual device 110 visually provides the information to the occupant of the vehicle 1. As the visual device 110, a display panel and a luminescent device are exemplified. As the display panel, a liquid crystal panel, an organic EL panel, and a touch screen are exemplified. As the luminescent device, an LED (Light Emitting Diode) is exemplified.

Figure 2:
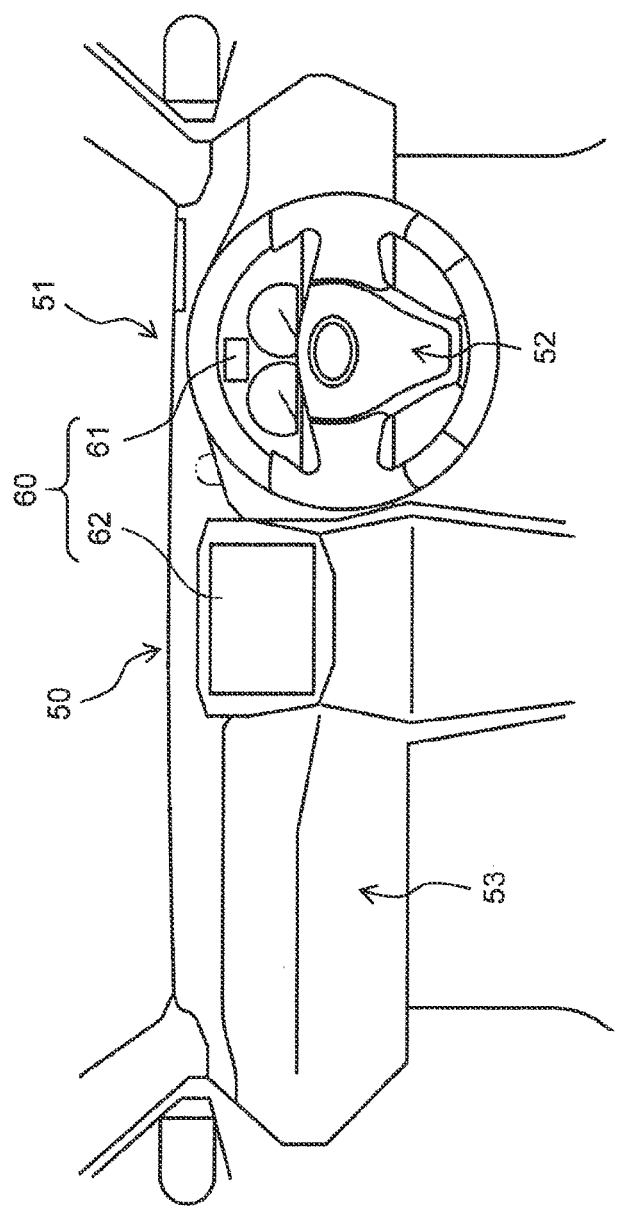
FIG. 2 is a diagram for explaining an example of a visual device in the first embodiment of the present disclosure.

FIG. 2 is a diagram for explaining an example of the visual device 110 and mainly illustrates a dashboard 50 of a vehicle 1. The dashboard 50 is a set of parts arranged in front of a driver's seat and a passenger's seat. For example, the dashboard 50 includes an instrument panel 51, a steering wheel 52, and a glovebox 53. The visual device 110 may be installed on the dashboard 50. In that case, the visual device 110 is likely to be included in an effective visual field (i.e., central and peripheral visual fields) of the driver.

For example, a display panel 60 is installed on the dashboard 50. In the example shown in FIG. 2, the instrument panel 51 behind the steering wheel 52 includes a first display panel 61. Moreover, the instrument panel 51 between the driver's seat and the passenger's seat includes a second display panel 62.

Figure 3:
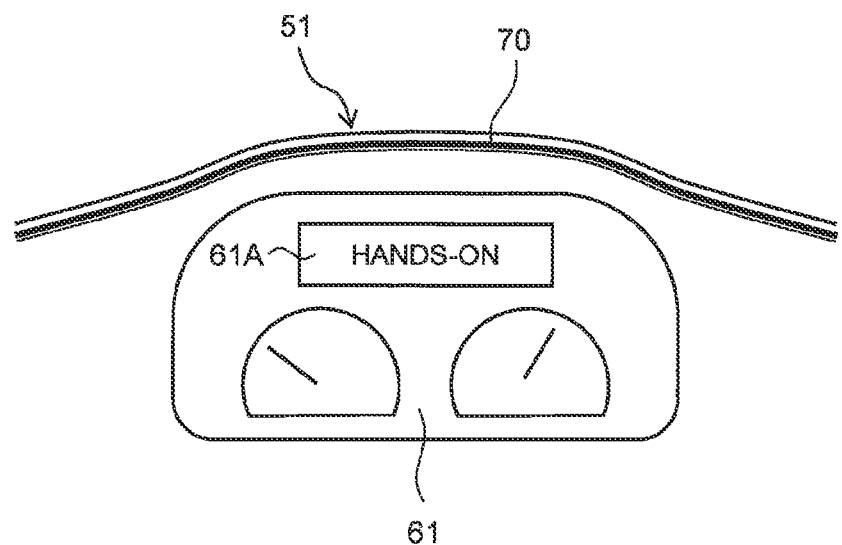
FIG. 3 is a diagram for explaining another example of the visual device in the first embodiment of the present disclosure.

FIG. 3 illustrates the first display panel 61 and its peripheral. The first display panel 61 includes a text display portion 61A. Textual information is displayed on the text display portion 61A. For example, textual information of "HANDS-ON" demanding of the driver to hands-on is displayed on the text display portion 61A.

In the example shown in FIG. 3, a band-shaped luminescent device 70 is disposed above the first display panel 61. The luminescent device 70 includes a group of LEDs arranged in a band shape. Such the luminescent device 70 can provide (represent) different information by emitting light in different colors. For example, "hands-on demand" is associated with a first color, and "hands-off notification" is associated with a second color that is different from the first color. In this case, the luminescent device 70 represents the "hands-on demand" by emitting light in the first color and represents the "hands-off notification" by emitting light in the second color.

Figure 4:
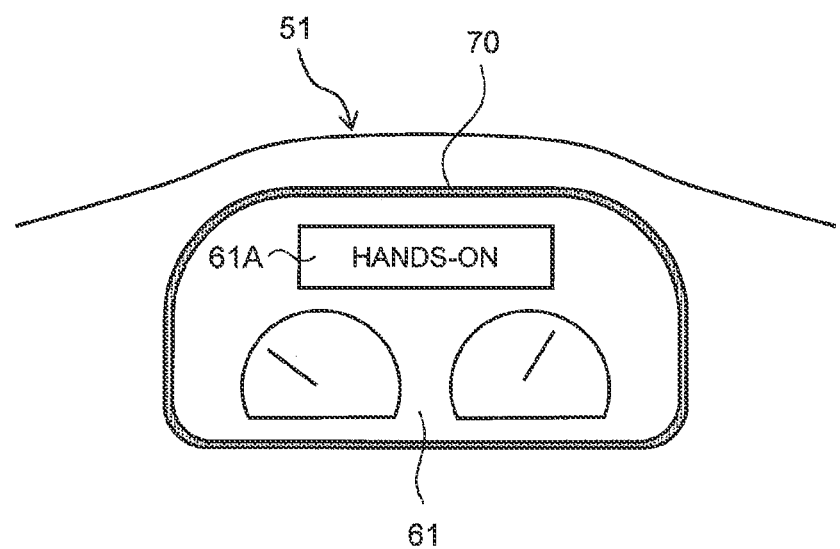
FIG. 4 is a diagram for explaining still another example of the visual device in the first embodiment of the present disclosure.

The shape of the luminescent device 70 is not limited to the band shape. For example, as illustrated in FIG. 4, the luminescent device 70 may be arranged so as to surround the first display panel 61.

Figure 5:
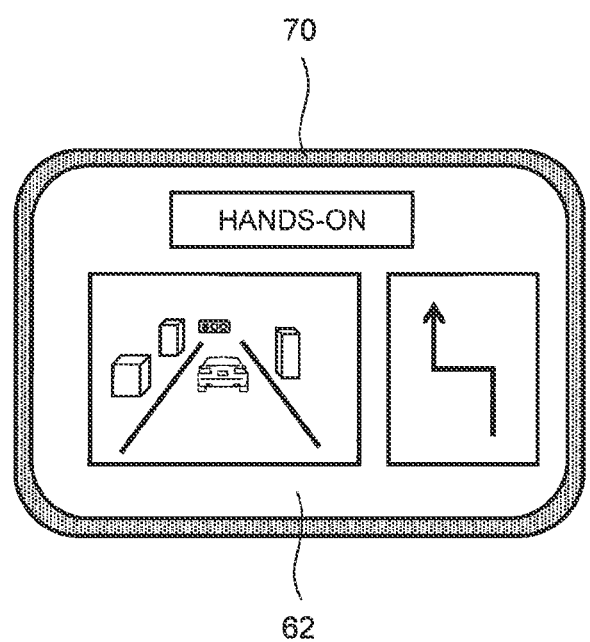
FIG. 5 is a diagram for explaining still another example of the visual device in the first embodiment of the present disclosure.

FIG. 5 illustrates the second display panel 62 and its peripheral. For example, the map information, the surrounding situation information (e.g., a recognition result by the sensor 20), an operation that is demanded of the driver (e.g., HANDS-ON), and the like are displayed on the second display panel 62. In addition, a luminescent device 70 may be arranged so as to surround the second display panel 62.

As another example, the luminescent device 70 may be installed on the steering wheel 52.

The visual device 110 includes at least one of the display panel 60 and the luminescent device 70.

As an example other than the dashboard 50, the visual device 110 may be installed on a door trim.

The controller 120 (see FIG. 1) controls the visual device 110. More particularly, the controller 120 includes a processor 121 and a memory 122. Various kinds of information are stored in the memory 122. The processor 121 controls the visual device 110 by executing a control program stored in memory 122. The control program may be recorded on a computer-readable recording medium.

The controller 120 is communicatively connected to the vehicle control system 10 via the interface 130. The controller 120 receives the information provision control signal CON from the vehicle control system 10 via the interface 130. The information provision control signal CON is stored in the memory 122.

Then, the controller 120 controls the visual device 110 so as to provide the information included in the information provision control signal CON in accordance with the information provision instruction. When the visual device 110 is the display panel 60, the controller 120 controls the display panel 60 so as to display the information included in the information provision control signal CON. When the visual device 110 is the luminescent device 70, the controller 120 controls the luminescent device 70 so as to emit light in a color associated with the information included in the information provision control signal CON.

Hereinafter, the processing by the controller 120 of the information provision system 100 according to the present embodiment will be described in more detail.

1-4. Information Provision Processing and Information Switching Processing

As described above, the controller 120 provides the information through the visual device 110. This processing is hereinafter referred to as "information provision processing." The controller 120 also executes "information switching processing" that switches the information to be provided through the visual device 110. The information before the switching is hereinafter referred to as "first information." The information after the switching, which is information different from the first information, is hereinafter referred to as "second information." That is, in the information switching processing, the controller 120 switches the providing information from the first information to the second information different from the first information. Here, "the information being different" means that at least one of a content, a type, a purpose, and a meaning of the information is different.

For example, the controller 120 switches between "the hands-on demand" and "the hands-off notification." In this case, one of the first information and the second information is "the hands-on demand", and the other is "the hands-off notification." For example, when the vehicle 1 enters the hands-on zone, the controller 120 switches the providing information from "the hands-off notification (the first information)" to "the hands-on demand (the second information)."

As another example, when the automated driving level of the vehicle 1 is changed, the controller 120 switches the providing information from "the automated driving level before the change (the first information)" to "the automated driving level after the change (the second information)."

As yet another example, when the previous stage of the activation of the driving assist control is detected, the controller 120 provides "the pre-warning of the activation of the driving assist control" as the information. In this case, the controller 120 switches the providing information from another information (the first information) to "the pre-warning of the activation of the driving assist control (the second information)."

As yet another example, when a surrounding vehicle (e.g., a high-speed following vehicle) is approaching the vehicle 1, the information provision system 100 provides "the notification that the surrounding vehicle is approaching" as the information. In this case, the controller 120 switches the providing information from another information (the first information) to "the notification that the surrounding vehicle is approaching (the second information)."

In this manner, the controller 120 executes the information switching processing in response to a predetermined trigger. The trigger for the information switching processing is exemplified by a change in an operation (e.g., hands-on, hands-off, braking operation) required for the driver, a change in the automated driving level of the vehicle 1, activation of the driving assist control, detection of the previous stage of the activation of the driving assist control, start of a preceding vehicle, approach of a surrounding vehicle, and so forth. To generalize, it can be said that the trigger for the information switching processing includes a change in driving environment that requires attention of the driver of the vehicle 1.

The trigger for the information switching processing is first recognized by the vehicle control system 10 described above. Upon recognizing the trigger, the vehicle control system 10 generates information to be newly provided, that is, the information provision control signal CON including the second information. Then, the vehicle control system 10 outputs the information provision control signal CON including the second information to the information provision system 100. The controller 120 of the information provision system 100 newly receives the information provision control signal CON and controls the visual device 110 so as to provide the second information included in the information provision control signal CON. That is, in response to the trigger, the controller 120 switches the providing information from the first information to the second information.

The second information after the switching is likely to be important to the occupant of the vehicle 1. It is therefore desirable for the occupant to easily notice the information change from the first information to the second information. For example, when the trigger for the information switching processing includes a change in driving environment that requires attention of the driver, it is desirable for the driver to easily notice the information change from the first information to the second information. In particular, during the automated driving of the vehicle 1, concentration of the driver is decreased as compared with a case of manual driving, and thus the driver may overlook the information change.

In view of the above, the present embodiment provides a technique that can facilitate the occupant of the vehicle 1 to more easily notice the information change. More specifically, the controller 120 executes the information switching processing as described below.

Figure 6:
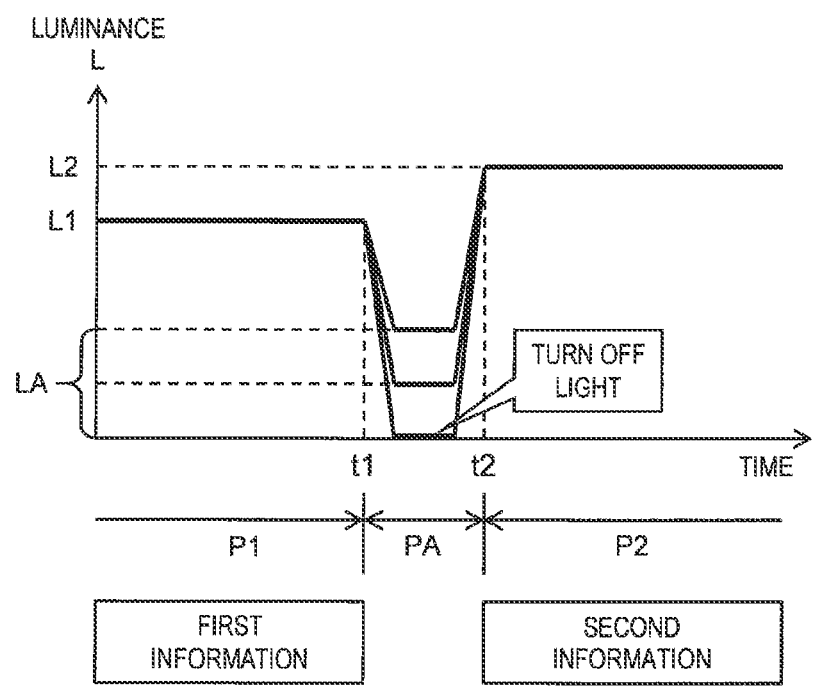
FIG. 6 is a conceptual diagram for explaining information switching processing according to the first embodiment of the present disclosure.

FIG. 6 is a conceptual diagram for explaining the information switching processing according to the present embodiment. A horizontal axis represents time, and a vertical axis represents a luminance L of the visual device 110. In a first period P1 prior to a time t1, the controller 120 causes the visual device 110 to provide the first information. A time t2 is later than the time t1. In a second period P2 after the time t2, the controller 120 causes the visual device 110 to provide the second information. Therefore, a period from the time t1 to the time t2, i.e., a period between the first period P1 and the second period P2 is an "information switching period PA" in which the information switching processing is performed.

The luminance L of the visual device 110 in the first period P1 is a first luminance L1. The luminance L of the visual device 110 in the second period P2 is a second luminance L2. The first luminance L1 and the second luminance L2 may be the same, or may be different from each other. The first luminance L1 and the second luminance L2 each may be a fixed value, or may be variably set by a setting operation of the visual device 110. Setting values of the first luminance L1 and the second luminance L2 may be included in the information provision control signal CON.

As shown in FIG. 6, the controller 120 temporarily decreases the luminance L of the visual device 110 during the information switching period PA. In other words, in at least a part of the information switching period PA, the controller 120 sets the luminance L of the visual device 110 to be a "transition luminance LA" lower than the first luminance L1 and the second luminance L2. The transition luminance LA=0 means that the visual device 110 is temporarily turned off. That is, the controller 120 may turn off the visual device 110 in at least a part of the information switching period PA.

As described above, according to the present embodiment, the luminance L of the visual device 110 is temporarily decreased during the information switching period PA. Human vision sensitively responds to a difference in the luminance L. Sensitivity to a change in the luminance L is high even in a peripheral visual field around a central visual field. Therefore, when the luminance L of the visual device 110 temporarily decreases, the occupant of the vehicle 1 is more likely to give close attention to the visual device 110. As a result, the occupant of the vehicle 1 can easily notice the change in information provided through the visual device 110.

Figure 7:
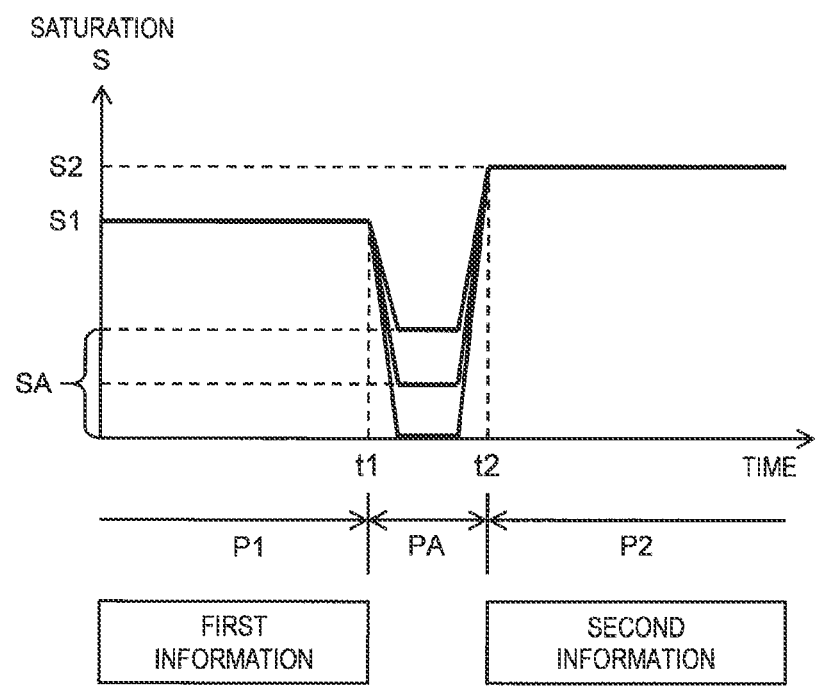
FIG. 7 is a conceptual diagram for explaining a modification example of the information switching processing according to the first embodiment of the present disclosure.

FIG. 7 shows a modification example of the information switching processing according to the present embodiment. A horizontal axis represents time, and a vertical axis represents a saturation S of the visual device 110. The saturation S of the visual device 110 in the first period P1 is a first saturation S1. The saturation S of the visual device 110 in the second period P2 is a second saturation S2. The first saturation S1 and the second saturation S2 may be the same, or may be different from each other. The first saturation S1 and the second saturation S2 each may be a fixed value, or may be variably set by a setting operation of the visual device 110. Setting values of the first saturation S1 and the second saturation S2 may be included in the information provision control signal CON.

As shown in FIG. 7, the controller 120 temporarily decreases the saturation S of the visual device 110 during the information switching period PA. In other words, in at least a part of the information switching period PA, the controller 120 sets the saturation S of the visual device 110 to be a "transition saturation SA" lower than the first saturation S1 and the second saturation S2. When the saturation S of the visual device 110 temporarily decreases, the occupant of the vehicle 1 is more likely to give close attention to the visual device 110. As a result, the occupant of the vehicle 1 can easily notice the change in information provided through the visual device 110.

Temporary decrease in at least one of the luminance L and the saturation S of the visual device 110 brings about the effect. Both the luminance L and saturation S of the visual device 110 may be temporarily decreased.

Figure 8:
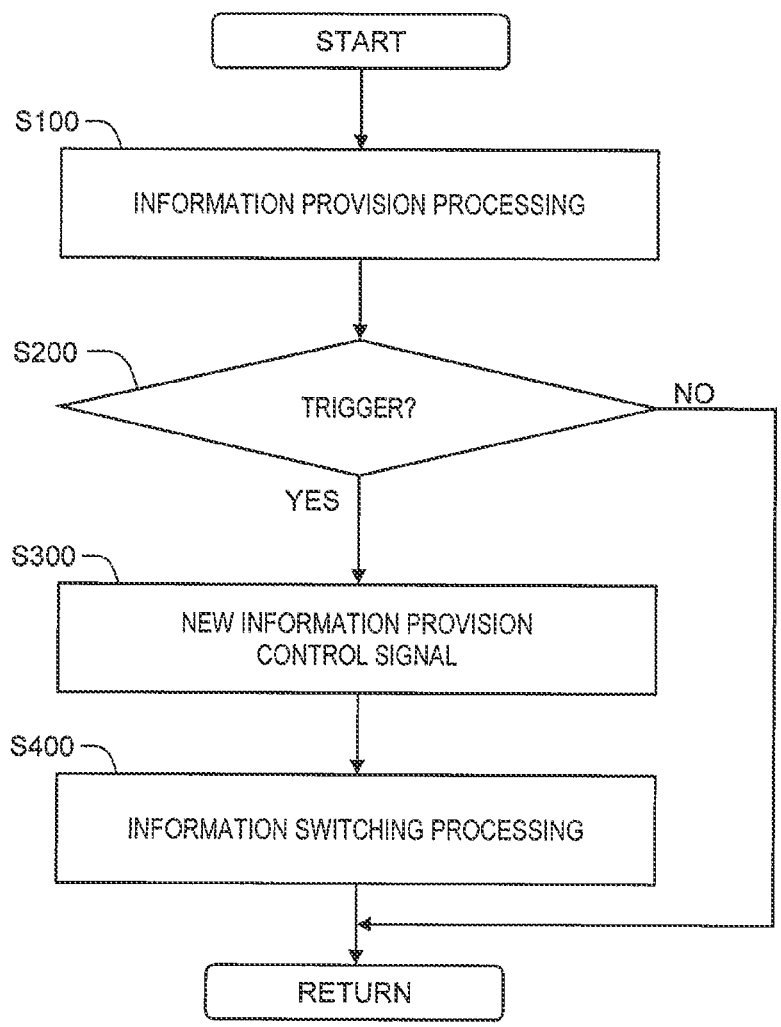
FIG. 8 is a flow chart summarizing information provision processing and the information switching processing according to the first embodiment of the present disclosure.

FIG. 8 is a flow chart summarizing the information provision processing and the information switching processing according to the present embodiment.

In Step S100, the information provision system 100 (i.e., the controller 120) provides information through the visual device 110. The information provided in the Step S100 is the first information.

In Step S200, the vehicle control system 10 determines whether or not the trigger for the information switching processing occurs. When no trigger occurs (Step S200; No), the processing returns to Step S100. On the other hand, when the trigger occurs (Step S200; Yes), the processing proceeds to Step S300.

In Step S300, the vehicle control system 10 outputs information to be newly provided, that is, the information provision control signal CON including the second information to the information provision system 100. The information provision system 100 receives a new information provision control signal CON. The information provision system 100 receives the new information provision control signal CON.

In subsequent Step S400, the information provision system 100 (i.e., the controller 120) executes the information switching processing. That is, the information provision system 100 switches the information provided through the visual device 110 from the first information to the second information. During the information switching processing, the information provision system 100 temporarily decreases at least one of the luminance L and the saturation S of the visual device 110. In other words, the information provision system 100 sets at least one of the luminance L and the saturation S of the visual device 110 to be lower than that in the first period P1 and the second period P2.

When the information switching processing is completed, the processing returns to Step S100. The second information after the switching becomes new first information.

1-5. Concrete Example

Hereinafter, a concrete example of the information provision processing and the information switching processing will be described. In the concrete example, the vehicle 1 is an automated driving vehicle, and the visual device 110 includes the luminescent device 70 (see FIGS. 3, 4, and 5). The luminescent device 70 can provide (represent) different information by emitting light in different colors. In the concrete example, the luminescent device 70 represents the "hands-on demand" and the "hands-off notification" distinctively by emitting light in different colors. A color associated with the "hands-on demand" is hereinafter referred to as a "hands-on color." On the other hand, a color associated with the "hands-off notification" is hereinafter referred to as a "hands-off color."

Figure 9:
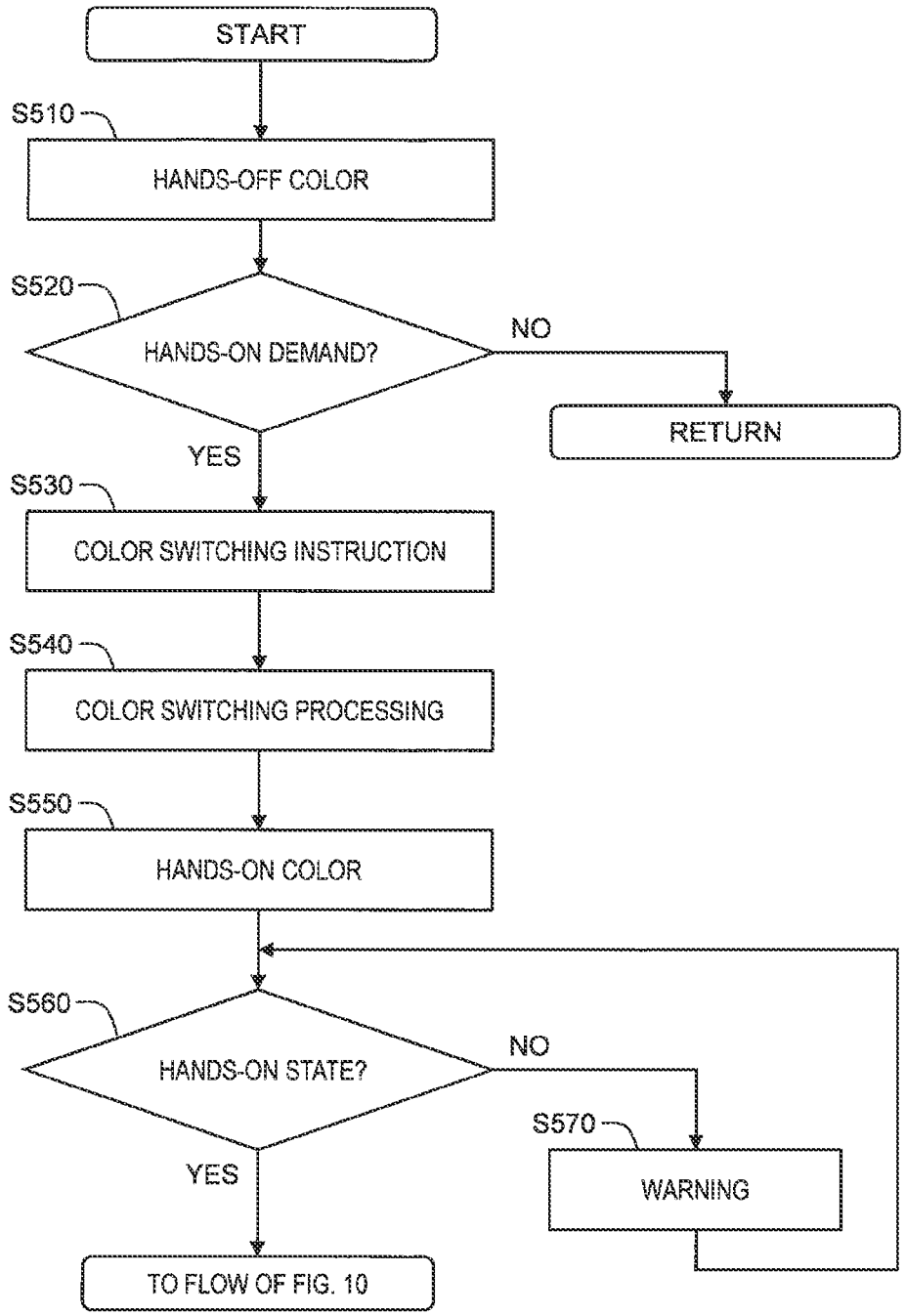
FIG. 9 is a flow chart showing a concrete example of the information provision processing and the information switching processing according to the first embodiment of the present disclosure.
Figure 10:
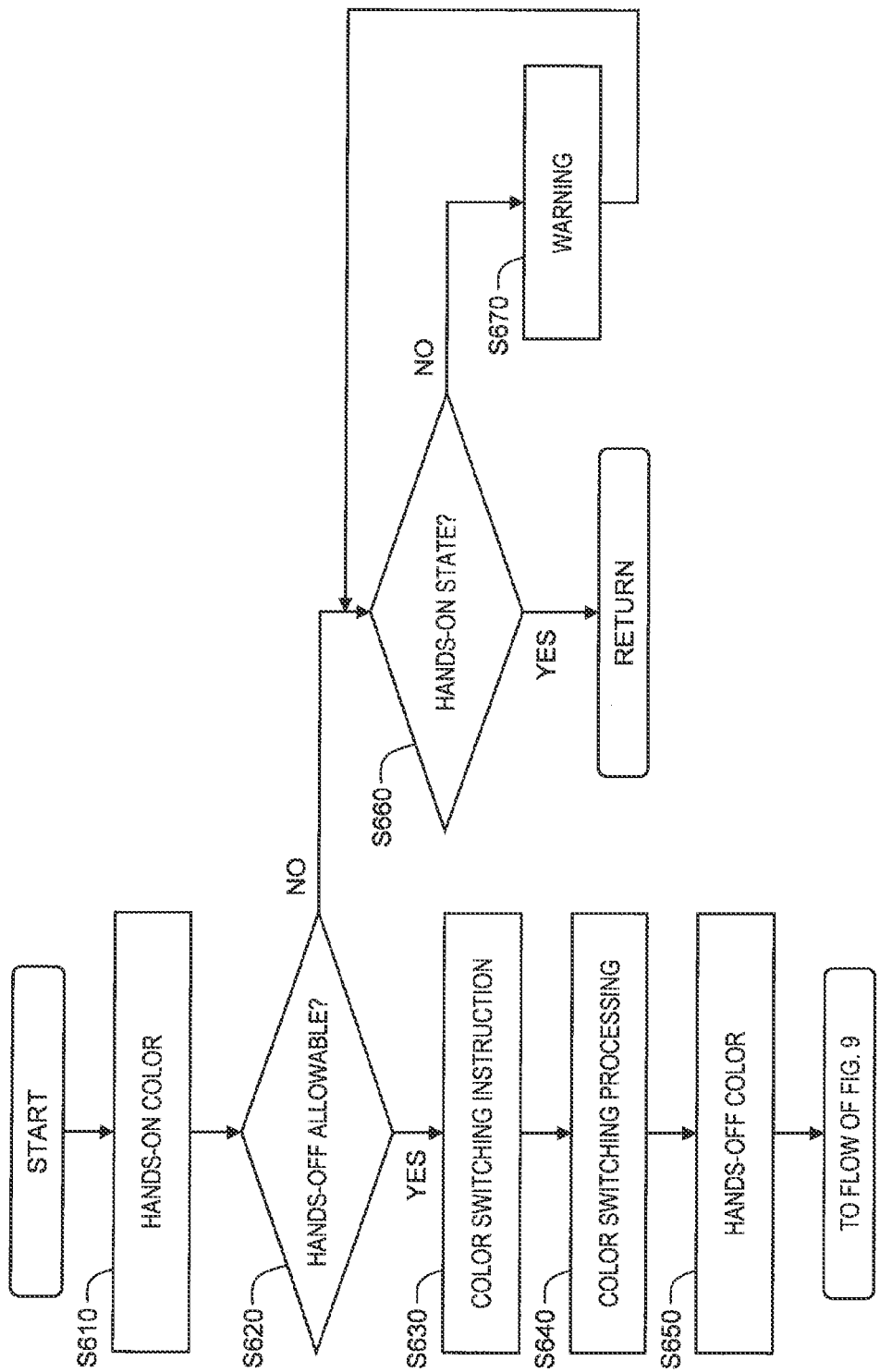
FIG. 10 is a flow chart showing a concrete example of the information provision processing and the information switching processing according to the first embodiment of the present disclosure.

FIGS. 9 and 10 are flow charts showing the concrete example. First, the flow shown in FIG. 9 will be described. At a start of the flow shown in FIG. 9, the vehicle 1 is located in a zone other than the hands-on zone, and the hands-off of the driver is allowed.

In Step S510, the controller 120 of the information-provision system 100 causes the luminescent device 70 to emit light in the hands-off color. This Step S510 corresponds to Step S100 (information provision processing) in FIG. 8.

In subsequent Step S520, the vehicle control system 10 determines whether or not it is necessary to demand of the driver to hands-on. For example, when the vehicle 1 is located within the hands-on zone or is likely to enter the hands-on zone, the vehicle control system 10 determines that it is necessary to demand of the driver to hands-on. This Step S520 corresponds to Step S200 in FIG. 8. When the hands-on demand is not necessary (Step S520; No), the processing returns to Step S510. On the other hand, when the hands-on demand is necessary (Step S520; Yes), the processing proceeds to Step S530.

In Step S530, the vehicle control system 10 instructs the information provision system 100 to provide the "hands-on demand." That is, the vehicle control system 10 instructs the information provision system 100 to switch from the hands-off color to the hands-on color. This Step S530 corresponds to Step S300 in FIG. 8.

In subsequent Step S540, the controller 120 of the information provision system 100 executes color switching processing that corresponds to the information switching processing. More specifically, the controller 120 temporarily decreases at least one of the luminance L and the saturation S of the luminescent device 70. Subsequently, the controller 120 changes the color of the luminescent device 70 from the hands-off color to the hands-on color. After that, the controller 120 restores the luminance L and the saturation S of the luminescent device 70. This Step S540 corresponds to Step S400 in FIG. 8.

In Step S550, the controller 120 causes the luminescent device 70 to emit light in the hands-on color.

In Step S560, the vehicle control system 10 determines, based on the driver state information, whether or not the driver grabs the steering wheel, that is, whether or not the driver state is the hands-on state. If the driver state is not the hands-on state (Step S560; No), the processing proceeds to Step S570.

In Step S570, the vehicle control system 10 instructs the information provision system 100 to issue a warning to the driver. In response to the instruction, the controller 120 of the information provision system 100 issues a warning to the driver. For example, the controller 120 causes the luminescent device 70 to blink in the hands-on color. Then, the processing returns to Step S560.

When the driver state becomes the hands-on state (Step S560; Yes), the processing proceeds to the flow shown in FIG. 10.

In Step S610, the controller 120 of the information-provision system 100 causes the luminescent device 70 to emit light in the hands-on color. This Step S610 corresponds to Step S100 (information provision processing) in FIG. 8.

In subsequent Step S620, the vehicle control system 10 determines whether or not the hands-off is allowable. For example, when the vehicle 1 is located in a zone other than the hands-on zone, the vehicle control system 10 determines that the hands-off is allowable. This Step S620 corresponds to Step S200 in FIG. 8. When the hands-off is not yet allowable (Step S620; No), the processing proceeds to Step S660. On the other hand, when the hands-off is allowable (Step S620; Yes), the processing proceeds to Step S630.

In Step S630, the vehicle control system 10 instructs the information provision system 100 to provide the "hands-off notification." That is, the vehicle control system 10 instructs the information provision system 100 to switch from the hands-on color to the hands-off color. This Step S630 corresponds to Step S300 in FIG. 8.

In subsequent Step S640, the controller 120 of the information provision system 100 executes color switching processing that corresponds to the information switching processing. More specifically, the controller 120 temporarily decreases at least one of the luminance L and the saturation S of the luminescent device 70. Subsequently, the controller 120 changes the color of the luminescent device 70 from the hands-on color to the hands-off color. After that, the controller 120 restores the luminance L and the saturation S of the luminescent device 70. This Step S640 corresponds to Step S400 in FIG. 8.

In Step S650, the controller 120 causes the luminescent device 70 to emit light in the hands-off color. After that, the processing proceeds to the flow shown in FIG. 9.

In Step S660, the vehicle control system 10 determines, based on the driver state information, whether or not the driver state is maintained at the hands-on state. When the driver state is maintained at the hands-on state (Step S660; Yes), the processing returns to Step S610. If the driver state is not the hands-on state (Step S660; No), the processing proceeds to Step S670.

In Step S670, the vehicle control system 10 instructs the information provision system 100 to issue a warning to the driver. In response to the instruction, the controller 120 of the information provision system 100 issues a warning to the driver. For example, the controller 120 causes the luminescent device 70 to blink in the hands-on color. Then, the processing returns to Step S660.

1-6. Effects

As described above, the information provision system 100 according to the present embodiment provides information to the occupant of the vehicle 1 through the visual device 110. The first information is provided in the first period P1, and the second information is provided in the second period P2 later than the first period P1. In the information switching period PA between the first period P1 and the second period P2, the information switches from the first information to the second information. In at least a part of the information switching period PA, the information provision system 100 sets at least one of the luminance L and the saturation S of the visual device 110 to be lower than that in the first period P1 and the second period P2. In other words, the information provision system 100 temporarily decreases at least one of the luminance L and the saturation S of the visual device 110 during the information switching period PA. At this time, due to the visual property of human, the occupant of the vehicle 1 is more likely to give close attention to the visual device 110. As a result, the occupant of the vehicle 1 can easily notice the change in information provided through the visual device 110.

As a first comparative example, let us consider a conventional technique described in Patent Literature 1. According to the conventional technique, the image displayed on the display means merely changes from the first image representing the information before the change to the second image representing the information after the change. Therefore, it is difficult for the occupant to notice the information change.

As a second comparative example, notifying the information change by an alarm is considered. However, if the alarm is sounded every time the information changes, the occupant feels annoyed. On the other hand, according to the present embodiment, it is possible to facilitate the occupant to easily notice the information change without sounding the alarm. Therefore, the occupant's sense of annoyance is reduced.

The visual device 110 may be installed on the dashboard 50. In that case, the visual device 110 is likely to be included in an effective visual field (i.e., central and peripheral visual fields) of the driver. Therefore, the driver can further easily notice the information change.

During the automated driving of the vehicle 1, concentration of the driver is decreased as compared with a case of manual driving, and thus the driver may overlook the information change. Therefore, the information switching processing according to the present embodiment may be advantageously applied to the automated driving vehicle.

2. Second Embodiment

In a second embodiment, the controller 120 of the information provision system 100 gives a warning to the driver of the vehicle 1 by causing the visual device 110 to blink. It should be noted that the visual device 110 in the second embodiment is exemplified not only by the display panel 60 and the luminescent device 70 but also by a room lighting and the like.

Figure 11:
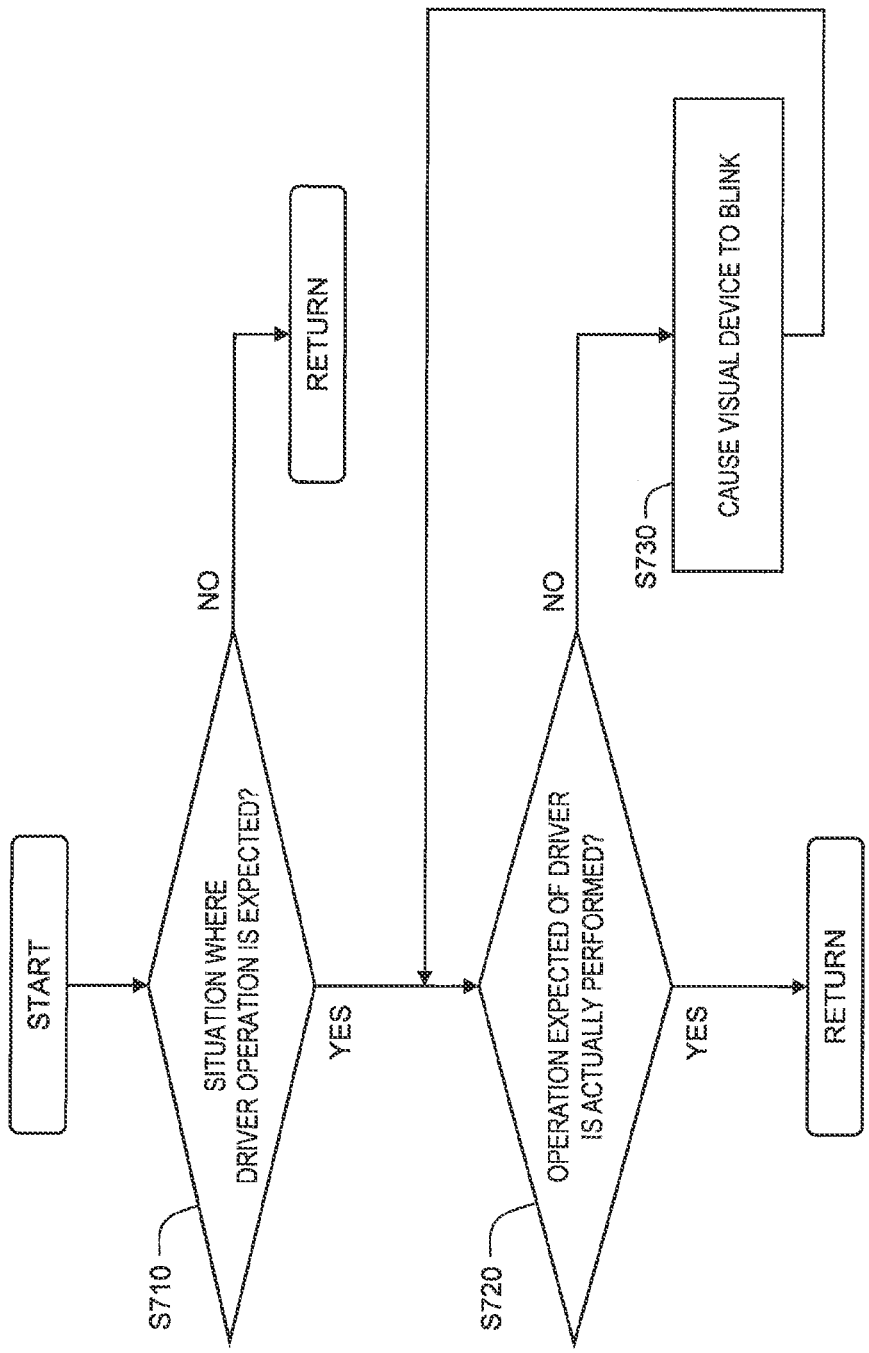
FIG. 11 is a flow chart showing the information provision processing according to a second embodiment of the present disclosure.

FIG. 11 is a flow chart showing the information provision processing according to the second embodiment.

In Step S710, the vehicle control system 10 determines whether or not there is an operation expected of the driver. For example, when the vehicle 1 is located within the hands-on zone, the driver is expected to grab the steering wheel, i.e., the hands-on state is expected. As another example, when the TTC with the preceding vehicle becomes less than a predetermined threshold, the driver is expected to perform a braking operation. When there is an operation expected of the driver (Step S710; Yes), the processing proceeds to Step S720.

In Step S720, the vehicle control system 10 determines whether or not the operation expected of the driver is actually performed by the driver. For example, the vehicle control system 10 can determine, based on the driver state information, whether or not the driver grabs the steering wheel, that is, whether or not the driver state is the hands-on state. As another example, the vehicle control system 10 can determine whether or not the driver performs the braking operation based on the vehicle state information. When the operation expected of the driver is not actually performed (Step S720; No), the processing proceeds to Step S730.

In Step S730, the vehicle control system 10 instructs the information provision system 100 to issue a warning to the driver. In response to the instruction, the controller 120 of the information provision system 100 issues a warning to the driver. More specifically, the controller 120 causes the visual device 110 to blink. Then, the processing returns to Step S720.

When the operation expected of the driver is actually performed (Step S720; Yes), the processing returns to Step S710.

As described above, according to the present embodiment, when the operation expected of the driver is not performed by the driver, the information provision system 100 causes the visual device 110 to blink. The blinking of the visual device 110 applies stimulus to the driver's vision. It is thus possible to urge the driver to pay attention.

What is claimed is:

1. An information provision system mounted on a vehicle, the vehicle being an automated driving vehicle that performs automated driving, and comprising:
a visual device configured to visually provide information to an occupant of the vehicle; and a controller configured to control the visual device, wherein the controller is further configured to:
cause the visual device to provide first information in a first period; and
cause the visual device to provide second information in a second period later than the first period, the second information being different from the first information in at least one of a content, a type, a purpose, and a meaning, wherein
at least one of a luminance and a saturation of the visual device in the second period is different than in the first period,
one of the first information and the second information is information demanding of a driver of the vehicle to grab a steering wheel during the automated driving, and another of the first information and the second information is information notifying that the driver is allowed to get hands off of the steering wheel during the automated driving,
the visual device includes a luminescent device having a plurality of LEDs and a display panel, the luminescent device represents different information by emitting light in different colors, the plurality of LEDs of the luminescent device are arranged in a band shape separate from the display panel, and
the controller is configured to set at least one of a luminance and a saturation of the visual device in at least a part of the second period to be higher than that in the first period.

2. The information provision system according to claim 1, wherein
the visual device is installed on a dashboard of the vehicle.

3. The information provision system according to claim 1, wherein
the visual device represents the first information in a first color and represents the second information in a second color different from the first color.

4. The information provision system according to claim 1, wherein in response to a trigger, the controller switches the information provided through the visual device from the first information to the second information, and
the trigger includes a change in driving environment that requires attention of a driver of the vehicle.

5. The information provision system according to claim 4, wherein
the trigger includes at least one of a change in an operation required for the driver, a change in an automated driving level of the vehicle, activation of driving assist control that assists driving of the vehicle, detection of a previous stage of the activation of the driving assist control, start of a preceding vehicle, and approach of a surrounding vehicle.

6. The information provision system according to claim 1, wherein the display panel includes a text display portion.

7. An information provision system mounted on a vehicle, the vehicle being an automated driving vehicle that performs automated driving, and comprising:
a visual device configured to visually provide information to an occupant of the vehicle; and a controller configured to control the visual device, wherein the controller is further configured to:
cause the visual device to provide first information in a first period; and
cause the visual device to provide second information in a second period later than the first period, the second information being different from the first information in at least one of a content, a type, a purpose, and a meaning, wherein
at least one of a luminance and a saturation of the visual device in the second period is different than in the first period, and
one of the first information and the second information is information demanding of a driver of the vehicle to grab a steering wheel during the automated driving, and another of the first information and the second information is information notifying that the driver is allowed to get hands off of the steering wheel during the automated driving,
the visual device includes a luminescent device having a plurality of LEDs and a display panel, the luminescent device represents different information by emitting light in different colors, the plurality of LEDs of the luminescent device are arranged so as to surround the display panel, and
the controller is configured to set at least one of a luminance and a saturation of the visual device in at least a part of the second period to be higher than that in the first period.

8. The information provision system according to claim 7, wherein
the visual device is installed on a dashboard of the vehicle.

9. The information provision system according to claim 7, wherein
the visual device represents the first information in a first color and represents the second information in a second color different from the first color.

10. The information provision system according to claim 7, wherein in response to a trigger, the controller switches the information provided through the visual device from the first information to the second information, and
the trigger includes a change in driving environment that requires attention of a driver of the vehicle.

11. The information provision system according to claim 10, wherein
the trigger includes at least one of a change in an operation required for the driver, a change in an automated driving level of the vehicle, activation of driving assist control that assists driving of the vehicle, detection of a previous stage of the activation of the driving assist control, start of a preceding vehicle, and approach of a surrounding vehicle.

12. The information provision system according to claim 7, wherein the display panel includes a text display portion.

\* \* \* \* \*